United States Patent
Mueller

(10) Patent No.: US 8,511,442 B2
(45) Date of Patent: Aug. 20, 2013

(54) BRAKE DISK

(75) Inventor: Hans-Walter Mueller, München (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/062,451

(22) PCT Filed: Aug. 5, 2009

(86) PCT No.: PCT/EP2009/060129
§ 371 (c)(1),
(2), (4) Date: Mar. 4, 2011

(87) PCT Pub. No.: WO2010/031634
PCT Pub. Date: Mar. 25, 2010

(65) Prior Publication Data
US 2011/0162925 A1  Jul. 7, 2011

(30) Foreign Application Priority Data
Sep. 17, 2008  (DE) .......................... 10 2008 042 173

(51) Int. Cl.
*F16D 65/12* (2006.01)
(52) U.S. Cl.
USPC ................................................... 188/218 XL
(58) Field of Classification Search
USPC .............................. 188/18 A, 218 XL, 218 A
See application file for complete search history.

(56) References Cited

U.S. PATENT DOCUMENTS

| | | | |
|---|---|---|---|
| 4,280,598 A * | 7/1981 | Pollinger | 188/218 XL |
| 4,501,346 A | 2/1985 | Bogenschutz | |
| 5,823,303 A | 10/1998 | Schwarz et al. | |
| 7,467,694 B2 * | 12/2008 | Botsch | 188/218 XL |
| 2001/0032761 A1 * | 10/2001 | Ruiz | 188/218 XL |
| 2003/0111303 A1 * | 6/2003 | Wirtanen | 188/17 |
| 2006/0113153 A1 * | 6/2006 | Simmonds | 188/218 XL |
| 2009/0020379 A1 * | 1/2009 | Hanna et al. | 188/218 XL |
| 2011/0259682 A1 * | 10/2011 | Mueller | 188/218 XL |

FOREIGN PATENT DOCUMENTS

| | | |
|---|---|---|
| CN | 101062682 | 10/2007 |
| DE | 8205003 | 7/1982 |
| DE | 3603547 | 8/1986 |
| DE | 4332951 | 8/1994 |
| DE | 10032662 | 5/2002 |
| DE | 102004035900 | 3/2006 |
| DE | 102006043945 | 3/2008 |
| DE | 102007054393 | 5/2009 |
| EP | 0198217 | 10/1986 |
| EP | 0318687 | 6/1989 |
| EP | 1 900 962 | 3/2008 |
| GB | 2172676 | 9/1986 |
| JP | 08505924 | 6/1996 |
| JP | 2008-518175 | 5/2008 |

OTHER PUBLICATIONS

International Search Report, PCT International Patent Application No. PCT/EP2009/060129, dated Dec. 4, 2009.

* cited by examiner

*Primary Examiner* — Christopher Schwartz
(74) *Attorney, Agent, or Firm* — Kenyon & Kenyon LLP

(57) ABSTRACT

A brake disk is described that has a friction ring and a disk pot that is connected to the friction ring via connecting elements. On the webs of the friction ring, bearer webs are fashioned into which the connecting elements extend. In addition, the bearer webs are fashioned in such a way that cooling air can flow around them.

11 Claims, 4 Drawing Sheets

(A-A)

BRAKE DISK

FIELD OF THE INVENTION

The present invention relates to a brake disk, in particular a ventilated brake disk, having a friction ring and a bearer part, in particular a disk pot, connected to a friction ring via connecting elements.

BACKGROUND INFORMATION

German Patent No. DE 43 32 951 A1 describes a ventilated brake disk that has a friction ring and a bearer part connected to the friction ring by connecting elements. The connecting elements are fashioned in particular as pins, bolts, or the like, and are distributed around the circumference of the bearer part. The connecting elements extend into openings in the circumferential wall of the friction ring. In this way, the friction ring is mounted in "floating" fashion on the disk pot. Here, when there is a rise in temperature caused by the braking process, the connecting elements can expand in the radial direction without danger of warping. However, given larger torques there is the danger that, due to the free length of the connecting elements, i.e., due to the distance between the bearer part and the friction ring, the connecting elements can bend, and in the extreme case can become detached from their seat.

German Patent Application No. DE 10 2007 054393 A1 describes a brake disk in which the friction ring and the brake pot are also made of different materials and are connected by connecting elements, in particular pins. In this brake disk, an extension is attached to the two friction surfaces that has a through-going bore or a blind hole bore into which the connecting elements extend. These extensions are connected to the two friction surfaces. This results in a large difference in mass between the friction surfaces and that of the extension. During operation, i.e., during braking, this causes a high temperature gradient between the extension and the friction surfaces. This causes high tension gradients that in the extreme case can cause crack formation in the friction surfaces. In addition, due to the size of the extensions the entry of air into the cooling ducts of the brake disk, situated between the friction surfaces, is impeded.

SUMMARY

An example brake disk according to the present invention may have the advantage that the existing conditions of installation of the brake disk do not have to be modified, but the flow of air is improved. Due to the fact that the extensions for guiding the connecting parts are integrally formed on the cross-bearers of the friction surfaces, an air space is created between the extension and the friction surfaces that improves the entry of air into the cooling ducts. In order to transmit the braking moment, the extension for guiding the connecting elements can be supported in a simple manner on the cross-bearers of the friction surfaces. For the supporting itself, no additional components are required, because the supporting takes place on the already-existing cross-bearers, so that the cross-bearers take on an additional function. In addition, through this measure the ratio of 3:1 between the wall thickness of the friction surface and the connecting elements can be ideally maintained. At this thickness ratio, not only is the temperature gradient between the friction surfaces and the extension modified, but cooling air also flows around the extension itself. The tendency to crack formation of these components is thereby reduced. The ventilation now taking place over almost the entire circumference of the extension for guiding the connecting elements results in a low heating of the extension. This has the result that only slight differences occur in the thermal expansion for the connecting elements, which are normally made of steel, and the extension, standardly made of cast iron. As a result, the movability of the pins in the bore of the extension is ensured in all temperature ranges during operation. It is possible to manufacture the extension with various outer geometries or outer contours. Given the use of a round or cylindrical outer contour, it is possible to process the outer contour and the bore for the connecting elements simultaneously and easily.

DETAILED DESCRIPTION OF EXAMPLE EMBODIMENTS

Figure 1:
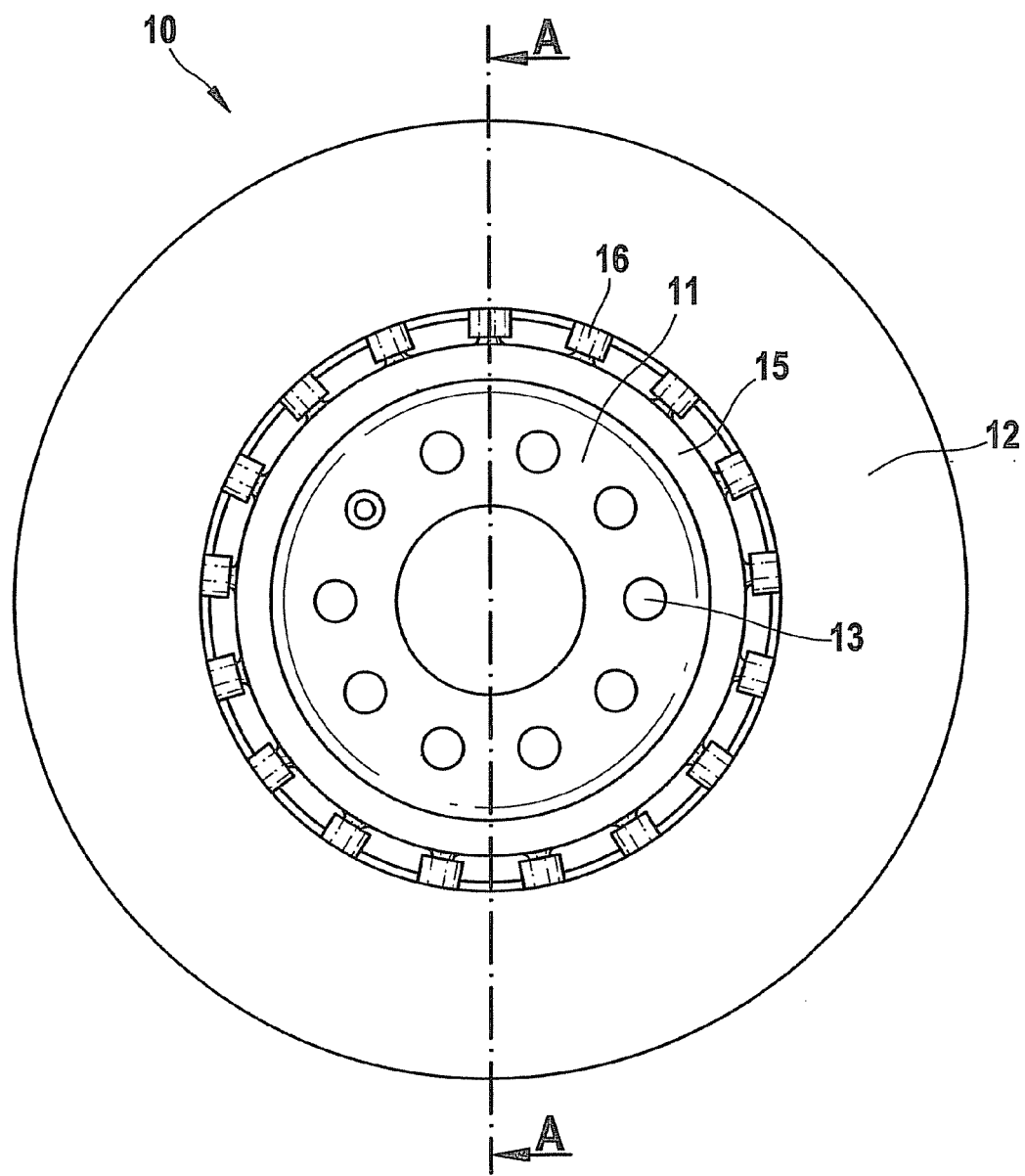
FIG. 1 shows an example brake disk in a top view.
Figure 2:
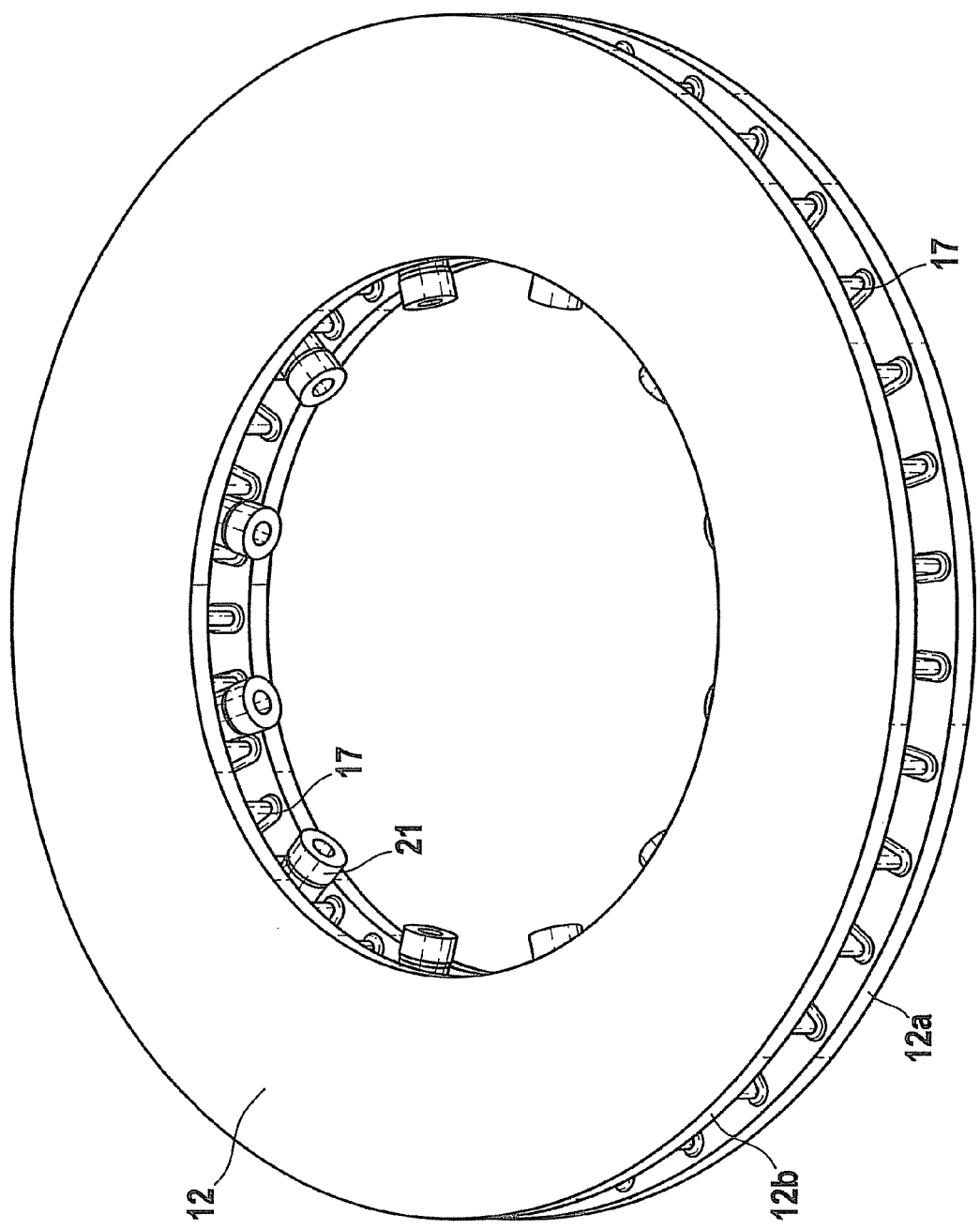
FIG. 2 shows a perspective representation of a brake disk without a disk pot.
Figure 3:
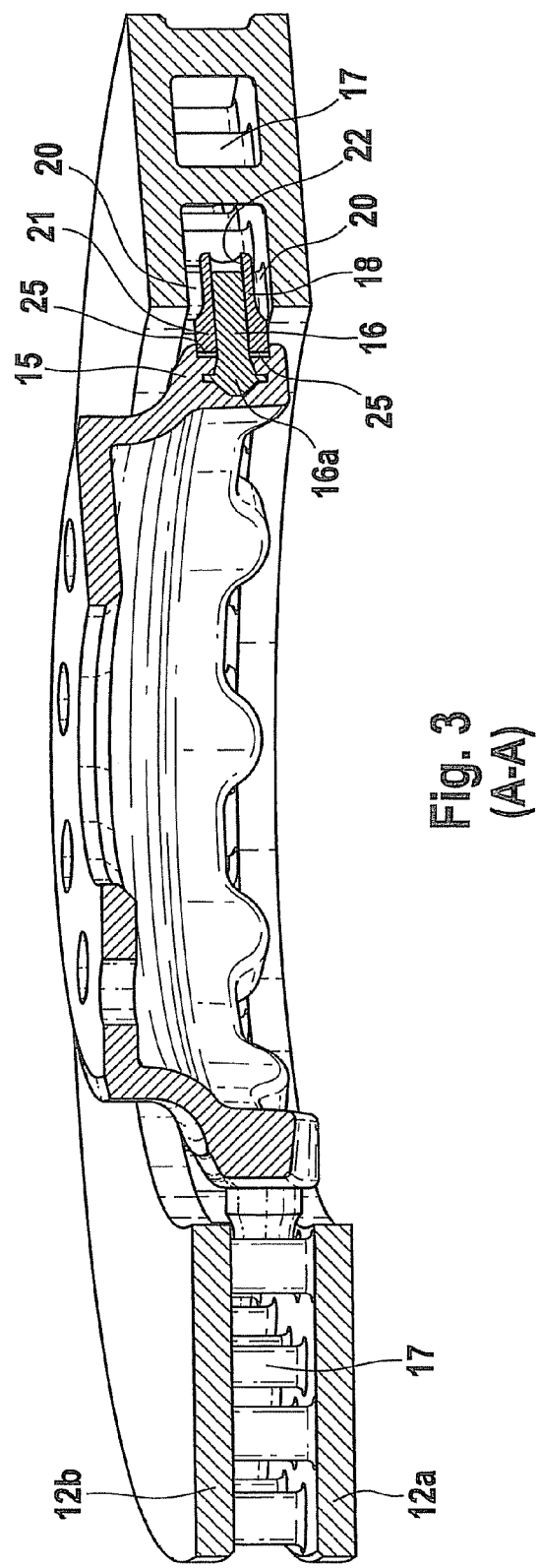
FIG. 3 shows a partial section A/A through the brake disk according to FIG. 1.
Figure 4:
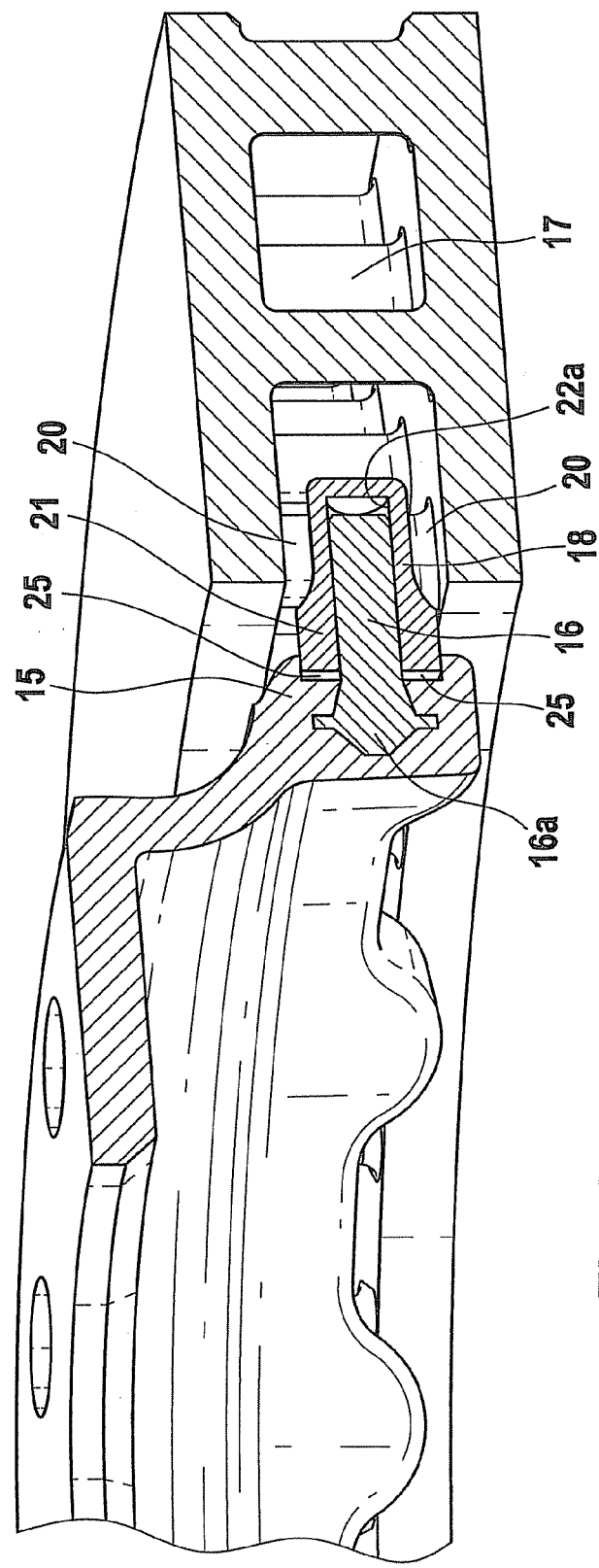
FIG. 4 shows a partial section through another exemplary embodiment.

In FIG. 1, reference character 10 designates a brake disk made up of a disk pot 11 and a friction ring 12. In a conventional manner, disk pot 11 is fastened (in a manner not shown here) on a hub of a vehicle, the fastening screws extending through bores 13 of disk pot 11. Disk pot 11 is connected to friction ring 12 (as is shown in more detail in FIGS. 2 and 3) via a large number of connecting elements 16 formed in circumferential wall 15 of disk pot 11, in the form of pins or bolts or the like. Friction ring 12 is made up of two friction rings 12a and 12b, which are connected to one another by a large number of webs 17 distributed over the circumference, and in particular running in the radial direction, so that a ventilated brake disk results. As can be seen in more detail in FIG. 2 and FIG. 3, bearer webs 18 that run radially are situated on two successive webs 17. Here, bearer webs 18 are situated segment by segment, so that in each case a free web 17 is situated between successive bearer webs 18, viewed in the circumferential direction. However, a different radial situation of bearer webs 18 is also possible. Bearer webs 18 are situated on webs 17, and there is, as much as possible, a gap 20 between the bearer webs and friction ring halves 12a and 12b. This gap 20 is provided so that cooling air flows around as much of the circumferential surface of bearer pins 18 as possible, and so that no heat transfer, or one that is as small as possible, can take place from friction ring halves 12a or 12b to bearer pins 18. Bearer web 18 has an extension 21 with which bearer web 18 protrudes radially outward past friction ring 12 in the direction of disk pot 11. In a particularly preferred manner, bearer web 18 can be fashioned cylindrically, or, seen in cross-section, with a rectangular or square shape. Bearer web 18 has a through-going bore 22 that also leads through extension 21. Bore 22 receives pins 16. As can be seen in FIG. 4, bore 22 may also be fashioned as a blind hole bore 22a. In the Figures, bores 22 are fashioned in the center longitudinal axis of friction ring 12. However, an offset of these bores 22 are possible, depending on the manner in which pins 16 are fashioned on disk pot 11.

Friction ring 12 is made of cast iron, while disk pot 11 is made of light metal, in particular aluminum or magnesium. During the casting process, bearer webs 18 are also cast on friction ring 12. Pin 16 is made of high-grade steel, in particular stainless high-grade steel. During manufacture, friction ring 12, made of cast iron, is first manufactured, as described above, and pins 16 are placed into bores 22. Subsequently, disk pot 11 is cast on. Here, heads 16*a* of pins 16 are also cast into outer wall 15 of disk pot 11. Here, extensions 21 of bearer webs 18 can also be used for the receiving in the casting tool of disk pot 11. The casting on takes place directly on the end face of extensions 21 of friction ring 12. During cooling of disk pot 11, a gap 25 arises between the end face of extension 21 and the end face of outer wall 15 of disk pot 11. However, this gap 25 should be as small as possible. Friction ring 12 is mounted in floating fashion on disk pot 11. For this purpose, pins 16 must be situated in bores 22 with a relatively small amount of play, so that friction ring 12 can move slightly on pins 16. This is because during the braking process friction ring 12 becomes warmer and expands away from disk pot 11 slightly in the radial direction. Because due to this slight relative movement absolute tightness is not possible, a temperature-resistant lubricant is situated in gap 25. In this way, on the one hand the gliding process of pin 16 in bore 22 is ensured, and on the other hand corrosion due to corrosive agents that may penetrate into the gap is prevented.

What is claimed is:

1. A brake ventilated disk, comprising:
   a friction ring made of at least two separate disks connected to each other by a web of connection elements; and
   a disk pot, a plurality of connecting parts connected to the disk pot being present on a circumference of the disk pot, the connecting parts extending into respective bearings of a web of bearings on the friction ring;
   wherein each of the bearings:
      is situated on a respective one of the connection elements of the web of the friction ring;
      includes a bore that extends longitudinally in a first direction for receiving a respective one of the connecting parts; and
      extends from the respective connection element at least one of (a) towards an interior circumference of the at least two disks and (b) perpendicular to the first direction, the extension defining an exterior surface of the respective bearing that is between, and separated from at least one of, the at least two disks.

2. The brake disk as recited in claim 1, wherein each of the bearings is situated on a respective pair of the connection elements of the web on the friction ring.

3. The brake disk as recited in claim 2, wherein the connection elements that connect the at least two disks include at least one connection element on which none of the bearings is situated.

4. The brake disk as recited in claim 2, wherein, for each two adjacent ones of the pairs of the connection elements, the connection elements that connect the at least two disks include a respective connection element (a) that separates the two adjacent pairs and (b) on which none of the bearings is situated.

5. The brake disk as recited in claim 1, wherein a gap is present between an outer circumference of the disk pot and an end face of each of at least one of the bearings that faces the outer circumference of the disk pot.

6. The brake disk as recited in claim 5, wherein a high-temperature-resistant, corrosion-inhibiting medium is situated in the gap.

7. The brake disk as recited in claim 1, wherein the separation of the each of the bearings from the at least one of the at least two disks is by a gap in which air flows.

8. The brake disk as recited in claim 1, wherein the extension of each of at least one of the bearings protrudes past the interior circumference of the at least two disks towards the disk pot.

9. The brake disk as recited in claim 1, wherein the bearings are cylindrical.

10. The brake disk as recited in claim 1, wherein the disk pot is made of aluminum, the friction ring is made of cast iron, and the connecting parts are made of high-grade steel.

11. The brake disk as recited in claim 1, wherein the connecting parts are one of pins and bolts.

* * * * *